United States Patent [19]

Minkhorst

[11] Patent Number: 4,549,757
[45] Date of Patent: Oct. 29, 1985

[54] BUMPER

[75] Inventor: Jan H. K. Minkhorst, Munstergeleen, Netherlands

[73] Assignee: Stamicarbon B.V., Geleen, Netherlands

[21] Appl. No.: 568,260

[22] Filed: Jan. 4, 1984

[30] Foreign Application Priority Data

Jan. 14, 1983 [NL] Netherlands ......................... 8300134

[51] Int. Cl.⁴ ............................................. B60R 19/08
[52] U.S. Cl. ..................................... 293/120; 293/155
[58] Field of Search .............................. 293/120–122, 293/126, 131, 132, 133, 135, 136, 151, 152, 155, 102

[56] References Cited

U.S. PATENT DOCUMENTS

| 4,061,384 | 12/1977 | Montgomery | 293/120 |
| 4,211,444 | 7/1980 | Glassmeyer | 293/150 |
| 4,391,464 | 7/1983 | Masotti | 293/120 |
| 4,397,490 | 8/1983 | Evans et al. | 293/120 |
| 4,460,206 | 7/1984 | Peter | 293/120 |

FOREIGN PATENT DOCUMENTS

| 0057155 | 1/1982 | European Pat. Off. |
| 2435373 | 4/1980 | France |
| 1550100 | 8/1979 | United Kingdom |

Primary Examiner—Robert R. Song
Attorney, Agent, or Firm—Cushman, Darby & Cushman

[57] ABSTRACT

Bumper comprising a plate-like element (1) made of a resilient plastic, having between two fastenings points (4,5) a stiffening member (7) leaving between this member and the fastening points unstiffened areas (10,11).

9 Claims, 4 Drawing Figures

BUMPER

The invention relates to a bumper comprising a plate-like element made of a resilient plastic, which element is provided with at least two lengthwise-arranged fastening points with means to fasten the element with spacers to an object that is to be projected against impact, for example a vehicle.

A similar bumper is known from DE-A No. 2708856, where the plate-like element is along practically its whole length provided with reinforcement ribs applied lengthwise. The ribs serve to attain maximum stiffness along the complete length of the element with a minimum amount of material. When a load is applied by a force in the direction of the protected object, at a point midway between the fastening points of the element, the element bends arch-like, with a maximum deflection at the point of application of the force. The disadvantage of the construction according to DE-A No. 2708856 is that with a given material, and a force to be absorbed as specified in, for example, ISO standards, and with maximum utilization of the strain in the elastic range of the material, a predictable maximum deflection occurs, which, if it is unacceptable, can be reduced only by increasing the material thickness. The consequence of this is that the tensile properties of the material are no longer maximally exploited and more material is used.

The object of the invention is to provide a bumper whereby the above-mentioned disadvantages are counteracted.

This is achieved by stiffening the element along some distance between two fastening points by stiffness-affording means, while maintaining unstiffened parts between the stiffened part and the fastening points.

When a force in the direction of the protected object applies at a point midway between the fastening points of the element, the element will no longer bend arch-like but the stiffened part will be displaced parallel with itself so that the bending-profile assumes the shape of a trapezoid, with as its base the imaginary line between the fastening points, as its lateral sides the strained unstiffened parts, and as the side parallel with the base the stiffened part. The maximum strain within the elastic region, and hence the maximum force to be absorbed, occur at a displacement much smaller than the maximum deflection in arch-like bending. This implies that, on the one hand, the distance from the element to the object protected can be taken smaller, which in the case of cars, for example, results in an advantageous reduction in total length, while on the other hand, if this distance is fixed, lower material thicknesses can be applied, or materials such as elastomers can be used, which have an intrinsically high strain/stress ratio and elasticity and are therefore ideal materials for bumpers.

The means for stiffening can comprise an oblong auxiliary part of higher flexural strength than the element mounted to the element so as to be unshiftable.

Preferably, the auxiliary part consists of profiled metal.

A particularly suitable metal auxiliary part is one which is trough-shaped in cross section and has wide, outward-projecting flanges on its open side.

It is of advantage to apply the auxiliary part to the side of the element not facing the protected object. All of the space between the element and the protected object is then available for displacement of the stiffened part.

The auxiliary part can be mounted to the element so as to be unshiftable by locking it between parts which protrude from and are integral with the element.

The element preferably constitutes the closing wall of the open side of a substantially trough-shaped plastics profile, which forms part of the bumper, the auxilliary part being locked tightly in a recess provided between a first rib pattern integral with the trough-shaped profile and a second rib pattern contiguous to the first which is integral with the element.

In order that the force to be absorbed may be greater, the unstiffened parts can have a greater material thickness than the other parts of the element. The unstiffened parts can each have a length which is one fourth the distance between the fastening points.

The invention will be explained with reference to an embodiment represented in the drawing.

Figure 1:
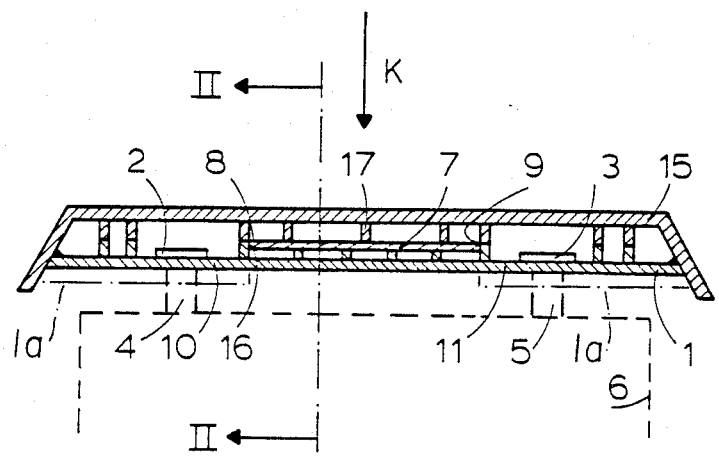
FIG. 1 is a sectional view of a bumper according to the invention.
Figure 2:
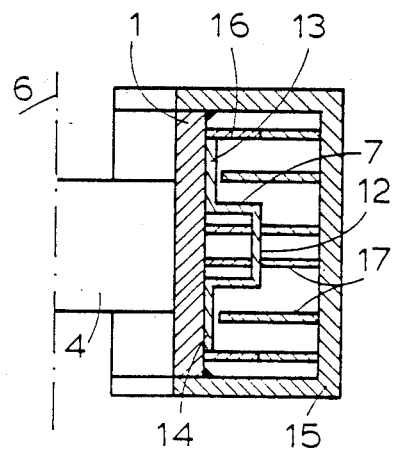
FIG. 2 is a transverse section along line II—II in FIG. 1.

In FIG. 1, a horizontal section is represented of a bumper as it is mounted to, for example, a vehicle under normal conditions. The buffer is built up of a plate-like element 1 with two fastening points 2 and 3 located along its length with fastening means 4 and 5 with which the element has been mounted to the projected object 6 indicated by the dotted line 6. The plate 1 is made of an elastomeric plastic which between the fastening points 2 and 3 has been stiffened so as to become virtually unbendable, with an auxiliary part 7 consisting of a metal profile with ends 8 and 9, while unstiffened parts 10 and 11 are maintained which are located between fastening point 2 and end 8 and between fastening point 3 and end 9, respectively. In transverse section, as shown by FIG. 2, the auxiliary part 7 has a trough-shaped middle section 12 with wide, outward-projecting flanges 13 and 14. Other profiles, such as trunks, can also be suitable. The bumper further comprises a trough-shaped profile 15 consisting of an elastomeric or other plastic, which on its open side is covered by the element 1. The ribs 16 of a rib pattern integral with the element 1 and the ribs 17 of a rib pattern integral with trough-shaped profile 15 are contiguous but offer a recess at the location of auxiliary part 7 in which the auxiliary part is locked tightly so as to be unshiftable relative to plate-like element 1. The rib patterns can extend in the entire space between the plate-like element 1 and the trough-shaped profile 15. The auxiliary part 7 can be mounted to the element 1 also in a different way, for example by hook-shaped protrusions which are integral with the element 1 and are located at least at the ends of the auxiliary part to mount the auxiliary part so that it is unshiftable at least in the longitudinal direction of the element. Element 1 can include a wall thickness which is greater at the unstiffened portions than at the stiffened portion as noted in FIG. 1 by the phantom line portion 1a.

Figure 3:
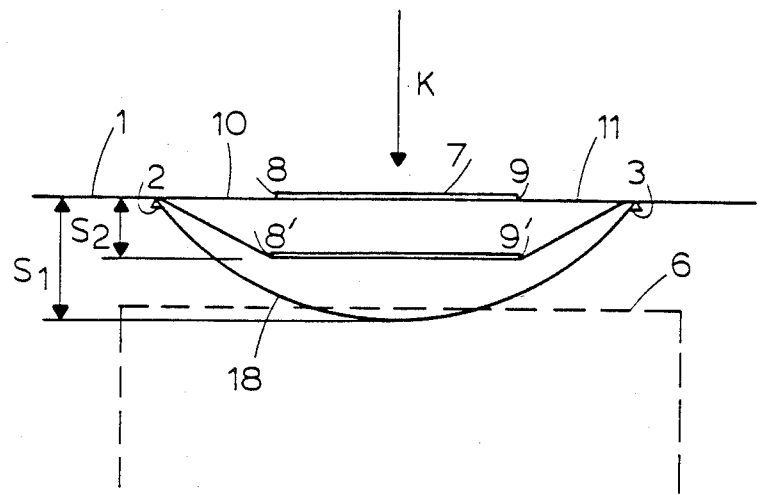
FIG. 3 is a schematic representation of an arched and a parallel displaced part of a plate-like element and FIG. 4 is a force-displacement diagram.

The functioning of the bumper according to the invention and its advantage over existing bumpers can be elucidated with FIG. 3, where the plate-like element is schematically represented by 1, the fastening points by 2 and 3, the auxiliary part by 7 and the ends of the auxiliary part by 8 and 9.

If a force K applies to an unstiffened element 1 midway between 2 and 3, the element will assume an arch-like bending profile indicated by 18. If the bending profile 18 also represents the situation where the limit of elastic strain has been reached, i.e. where the element is not permanently deformed but will spring back virtually to its initial position after the force is removed, also the ultimate deflection S1 is fixed. If this deflection S1 is not acceptable, a greater material thickness will have to be chosen for the element 1. The tensile properties of the material will then no longer be maximally utilised. If under otherwise identical conditions the element 1 is stiffened with the auxiliary part 7, while unstiffened parts 10 and 11 are maintained, which in this case each are one fourth the length between the points 2 and 3, the bending profile will assume the shape of the trapezoid 2-8'-9'-3. The parts 2-8 and 9-3 which take part in the strain are now much shorter and in addition reach the maximum strain in the elastic range after a shorter strain path. As a result, the maximum deflection is not S1 but S2, S2 bein considerably less than S1 and possibly lying within the acceptable distance. The measure of applying an auxiliary part can be combined with a greater material thickness of the unstiffened parts 10 and 11.

EXAMPLE

A bumper made according to the invention is subjected to a static-load test in which the bumper is supported at the fastening points. From the middle, the bumper has been stiffened to half the distance to the fastening points. A force is exerted which applies midway between the fastening points.

Figure 4:
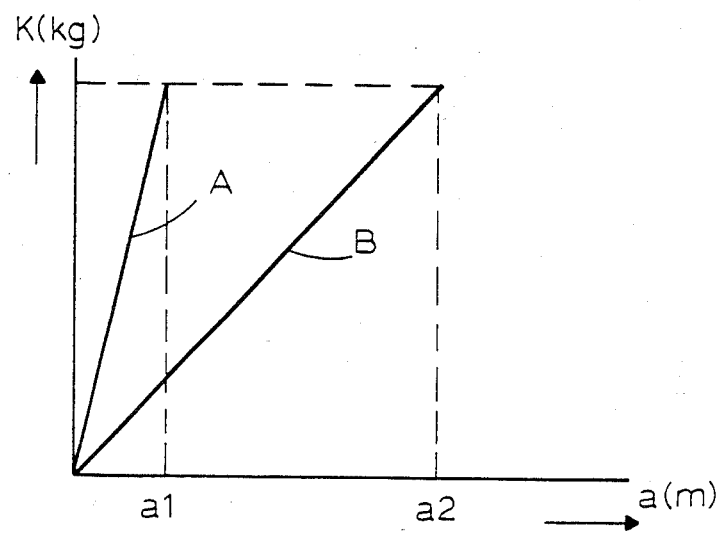

The bumper has been made by injection moulding from a thermoplastic elastomeric material available from DSM under the name of KELTAN TP 0603. This material has a Shore D hardness of 61 and a melt flow index of 22 dg/min. In the stress-displacement diagram in FIG. 4, line A represents the relation between the force K and the displacement. Line B is included as a comparative example and represents the relation for the same bumper but without a stiffened part. It is found that the ultimate displacement a1 for a bumper according to the invention is only one fourth of that of the bumper without a stiffened part, a2. The displacements a1 and a2 are the points where the maximum strain in the elastic region of the material is just reached in the cases A and B respectively.

I claim:

1. Bumper to protect an object, for example a vehicle, against impact, said bumper comprising a plate-like element consisting essentially of a resilient plastic, said element including at least two lengthwise-arranged fastening points, means for fastening the element, at said fastening points, in spaced relationn to an object that is to be protected against impact, and stiffening means positioned between said two fastening points for providing a stiffened portion of said element along a predetermined lengthwise distance, said stiffened portion also establishing at least one pair of unstiffened portions of said element, each said unstiffened portion being positioned between said stiffened portion and a respective one of said fastening points.

2. Bumper according to claim 1 wherein said stiffening means includes an oblong auxiliary part of higher flexural strength than the element and means rigidly attaching said auxiliary part to said element so as to be unshiftable relative thereto.

3. Bumper according to claim 2 wherein said auxiliary part consists of profiled metal.

4. Bumper according to claim 1 wherein said stiffening means disposed on a side of the element which faces away from the protected object.

5. Bumper according to claim 2 wherein said auxiliary part is locked between protruding parts which protrude from and are integral with the element.

6. Bumper according to claim 2 further comprising a substantially trough-shaped profile member made of plastics and having an open side, said element forming the closing wall of the open side of the substantially trough-shaped profile member, said profile member integrally including a first rib pattern, said element integrally including a second rib pattern contiguous with said first rib pattern and defining a recess therewith, and wherein the auxiliary part is tightly locked in the recess defined between the first and second rib patterns.

7. Bumper according to claim 1 wherein the wall thickness of the plate-like element is greater at the unstiffened portions than at the stiffened portion.

8. Bumper according to claim 2 wherein the auxiliary part is trough-shaped in transverse section and has an open side with wide, outwardly-projecting flanges on the open side.

9. Bumper according to claim 1 wherein the length of each of the unstiffened portions of the element is one-fourth the distance between the fastening points.

* * * * *